United States Patent
Jeon

(10) Patent No.: US 12,202,349 B2
(45) Date of Patent: Jan. 21, 2025

(54) WHEEL STRUCTURE INCLUDING HUB BEARING AND VEHICLE INCLUDING THE SAME

(71) Applicant: HYUNDAI MOBIS CO., LTD., Seoul (KR)

(72) Inventor: Jin Moo Jeon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 682 days.

(21) Appl. No.: 17/490,253

(22) Filed: Sep. 30, 2021

(65) Prior Publication Data
US 2023/0012737 A1    Jan. 19, 2023

(30) Foreign Application Priority Data
Jul. 13, 2021    (KR) .......................... 10-2021-0091804

(51) Int. Cl.
*B60K 7/00*    (2006.01)
*B60B 27/00*    (2006.01)

(52) U.S. Cl.
CPC ........ *B60K 7/0007* (2013.01); *B60B 27/0068* (2013.01); *B60K 2007/0038* (2013.01); *B60Y 2400/3032* (2013.01); *F16C 2233/00* (2013.01)

(58) Field of Classification Search
CPC .......... B60K 7/0007; B60K 2007/0092; B60K 2007/0038; B60Y 2400/3032; B60B 27/0068
See application file for complete search history.

(56) References Cited

U.S. PATENT DOCUMENTS

| | | | |
|---|---|---|---|
| 6,942,049 B2* | 9/2005 | Shimizu .............. | B60K 7/0007 180/65.6 |
| 7,621,835 B2* | 11/2009 | Oshidari ............. | B60K 7/0007 475/5 |
| 7,958,959 B2* | 6/2011 | Yogo .................... | B60G 13/16 903/906 |
| 8,932,166 B2* | 1/2015 | Suzuki .................... | B60K 1/00 475/5 |

(Continued)

FOREIGN PATENT DOCUMENTS

DE    10 2020 115 673 A1    12/2020
JP         2007-253686 A     10/2007

(Continued)

OTHER PUBLICATIONS

German Office Action issued on May 10, 2022, in counterpart German Patent Application No. 10 2021 128 293.4 (7 pages in German).

(Continued)

*Primary Examiner* — Jeffrey J Restifo
(74) *Attorney, Agent, or Firm* — NSIP Law

(57) ABSTRACT

A wheel structure includes: a wheel; a rotary part disposed inside the wheel and configured to rotate together with the wheel; a fixing part facing the rotary part; a hub bearing disposed at one side of the rotary part and the fixing part; and a resolver facing the hub bearing and configured to detect a position of the hub bearing. The hub bearing includes: a hub body fixedly coupled to the rotary part; and a hub outer race fixedly coupled to the fixing part. The resolver includes: a resolver rotor; and a resolver stator. The resolver rotor is fixedly coupled to the hub body.

17 Claims, 7 Drawing Sheets

(56) References Cited

U.S. PATENT DOCUMENTS

| | | | |
|---|---|---|---|
| 9,333,843 B2* | 5/2016 | Suzuki | B60B 35/18 |
| 9,705,378 B2* | 7/2017 | Suzuki | H02K 7/116 |
| 9,729,026 B2* | 8/2017 | Makino | B60K 7/0007 |
| 9,735,648 B2* | 8/2017 | Suzuki | B60K 17/046 |
| 10,259,317 B2* | 4/2019 | Shin | B60K 17/046 |
| 10,752,104 B2* | 8/2020 | Kawamura | H02K 7/085 |
| 11,447,003 B2* | 9/2022 | Yabuta | F16D 65/12 |
| 11,577,598 B2* | 2/2023 | Kawamura | H02K 11/21 |
| 11,772,479 B2* | 10/2023 | Li | B60K 17/046 |
| | | | 180/65.51 |
| 11,794,516 B2* | 10/2023 | Shin | B60B 27/0015 |
| 11,967,867 B2* | 4/2024 | Sano | H02K 1/2791 |
| 11,990,822 B2* | 5/2024 | Yada | B60B 27/0052 |
| 11,999,190 B2* | 6/2024 | Shin | G01P 1/026 |
| 12,005,784 B2* | 6/2024 | Li | F16H 1/28 |
| 2016/0068054 A1* | 3/2016 | Abe | F16D 3/185 |
| | | | 180/65.51 |
| 2016/0121709 A1* | 5/2016 | Shin | B60T 11/10 |
| | | | 301/6.5 |
| 2020/0391547 A1* | 12/2020 | Shin | B60K 7/0007 |
| 2021/0075289 A1* | 3/2021 | Yada | B60B 27/0052 |
| 2022/0314783 A1* | 10/2022 | Yada | B60K 7/0007 |
| 2023/0012737 A1* | 1/2023 | Jeon | B60B 27/0068 |
| 2023/0094579 A1* | 3/2023 | Yada | B60K 17/354 |
| | | | 180/65.51 |
| 2023/0098893 A1* | 3/2023 | Yada | B60K 17/354 |
| | | | 301/6.5 |
| 2024/0017606 A1* | 1/2024 | Park | B60K 7/0007 |

FOREIGN PATENT DOCUMENTS

| | | |
|---|---|---|
| JP | 2019-73170 A | 5/2019 |
| KR | 10-2017-0006431 A | 1/2017 |
| KR | 10-2020-0143831 A | 12/2020 |

OTHER PUBLICATIONS

Korean Office Action issued on Feb. 24, 2023, in counterpart Korean Patent Application No. 10-2021-0091804 (7 pages in Korean).

* cited by examiner

WHEEL STRUCTURE INCLUDING HUB BEARING AND VEHICLE INCLUDING THE SAME

CROSS-REFERENCE TO RELATED APPLICATIONS

This application claims the benefit under 35 U.S.C. § 119(a) of Korean Patent Application No. 10-2021-0091804 filed on Jul. 13, 2021 in the Korean Intellectual Property Office, the entire disclosure of which is incorporated herein by reference for all purposes.

TECHNICAL FIELD

The present disclosure relates to a wheel structure including a hub bearing and a vehicle including the same, and more particularly, to a wheel structure including a sensor and a vehicle including the same.

BACKGROUND ART

A motor for converting electrical energy into kinetic energy may be applied to various fields and mounted in various devices. For example, the motor may be mounted in a vehicle and produce power for driving the vehicle. In particular, with the increase in demands for environmentally friendly vehicles for solving problems of environmental pollution emitted from internal combustion engines in the related art, there is also an increasing demand for the motor mounted in the vehicle.

An in-wheel drive device having a structure in which a motor is mounted in a wheel for a vehicle generally has a wheel bearing and the like in addition to the motor. The wheel bearing serves to transmit a rotational force of the motor to the wheel and structurally support components disposed in the wheel.

Meanwhile, in the case of an in-wheel drive device, a sensor such as a resolver capable of detecting a position of a motor needs to be provided to control the motor. However, in the related art, the sensor for detecting the position of the motor is large in size and heavy in weight, which makes it difficult to configure the in-wheel drive device.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a wheel structure includes: a wheel; a rotary part disposed inside the wheel and configured to rotate together with the wheel; a fixing part facing the rotary part; a hub bearing disposed at one side of the rotary part and the fixing part; and a resolver facing the hub bearing and configured to detect a position of the hub bearing. The hub bearing includes: a hub body fixedly coupled to the rotary part; and a hub outer race fixedly coupled to the fixing part. The resolver includes: a resolver rotor; and a resolver stator. The resolver rotor is fixedly coupled to the hub body.

The wheel structure may further include a cap member fixedly coupled to one side of the hub outer race in an axial direction. The resolver stator may be disposed inside the cap member.

The resolver stator may be disposed outside the resolver rotor in a radial direction, and disposed to face the resolver rotor.

The hub body may include: a first region facing the hub outer race in a radial direction; and a second region fixedly coupled to one side of the first region in the axial direction. The resolver rotor may be fixedly coupled to an outer portion of the second region in the radial direction.

The second region may be integrated with the first region, or the second region may have a structure press-fitted with the first region in the axial direction.

The hub bearing may further include: a rolling element disposed between the hub body and the hub outer race in the radial direction; and a hub inner race press-fitted with the hub body and facing the rolling element. The hub inner race may face the second region, and the first region may be interposed between the hub inner race and the second region.

The second region may protrude from the first region in the axial direction.

The wheel structure may further include a speed sensor disposed inside the cap member, and configured to detect a rotational speed of the hub bearing.

The speed sensor may be disposed in a space between the hub body and the hub outer race in a radial direction.

The wheel structure may further include a connector inserted into the cap member, and electrically connected to the resolver.

The rotary part may include: a rotor housing fixedly coupled to an inner portion of the wheel in a radial direction; and a rotor fixedly coupled to an inner portion of the rotor housing in the radial direction.

The fixing part may include: a stator housing fixedly coupled to an outer portion of the hub outer race in the radial direction; and a stator fixedly coupled to an outer portion of the stator housing in the radial direction. The rotor and the stator may face each other in the radial direction.

The wheel structure may further include a bracket fixedly coupled to the hub outer race and the stator housing. An inner region of the bracket in the radial direction may be bolted to the hub outer race, and an outer region of the bracket in the radial direction may be bolted to the stator housing.

The wheel structure may further include a carrier fixedly coupled to the bracket. An inner region of the carrier in the radial direction may be bolted to the bracket.

The hub body may include a forming region disposed at an outer side of the hub body in the axial direction, and disposed inside the cap member. The forming region may be bent to surround the hub inner race.

In another general aspect, a vehicle includes: a wheel structure; and a vehicle body to which a portion of the wheel structure is fixedly coupled. The wheel structure includes: a wheel; a rotary part disposed inside the wheel and configured to rotate together with the wheel; a fixing part facing the rotary part; a hub bearing disposed at one side of the rotary part and the fixing part; and a resolver facing the hub bearing and configured to detect a position of the hub bearing. The hub bearing includes a hub body fixedly coupled to the rotary part, and a hub outer race fixedly coupled to the fixing part. The resolver includes a resolver rotor and a resolver stator. The resolver rotor is fixedly coupled to the hub body.

The vehicle may further include a brake assembly disposed between the wheel and the hub body in a radial direction of the wheel structure.

Other features and aspects will be apparent from the following detailed description, the drawings, and the claims.

DETAILED DESCRIPTION

Hereinafter, a wheel structure and a vehicle according to the present disclosure will be described with reference to the drawings.

Wheel Structure

Figure 1:
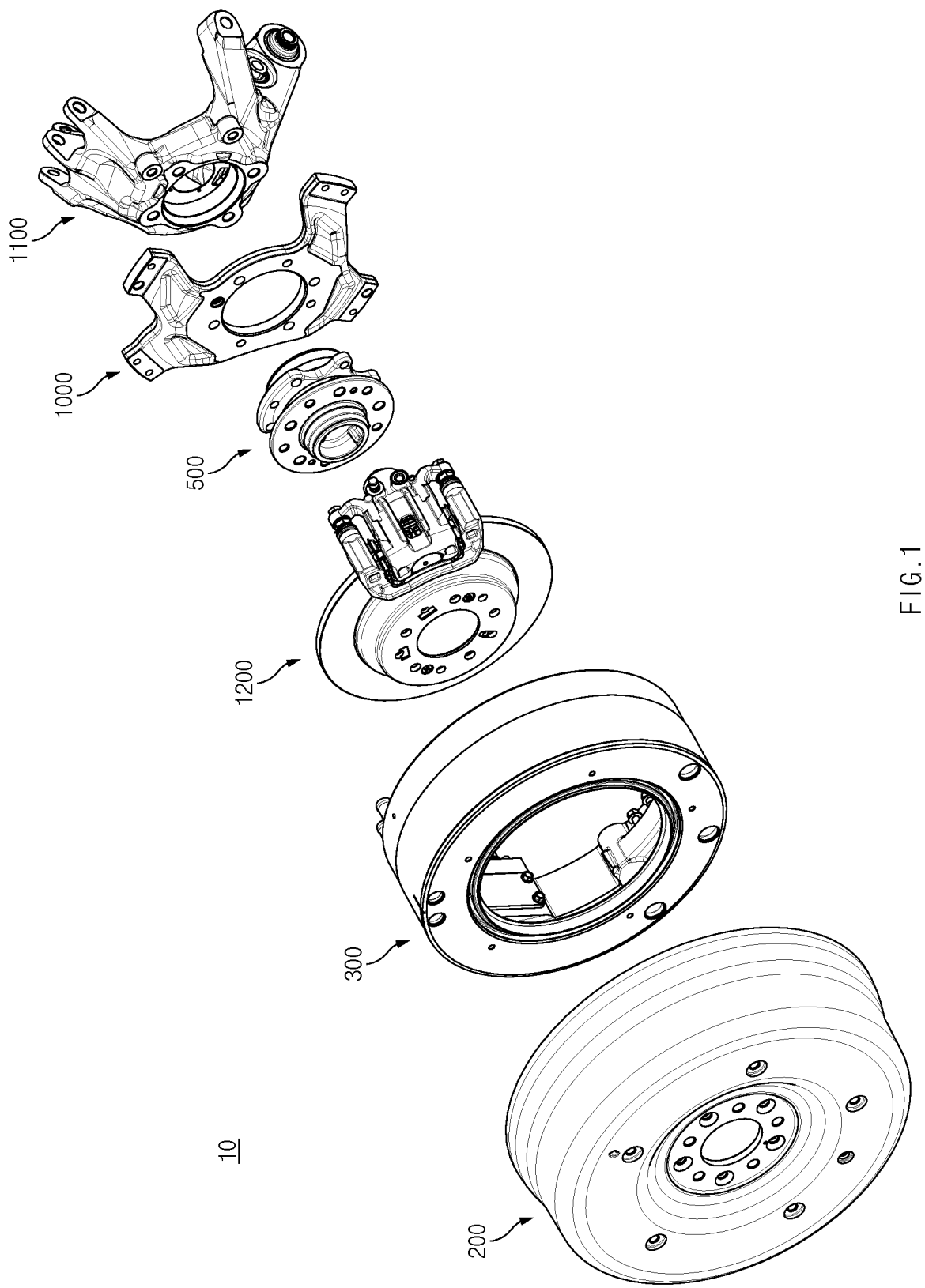
FIG. 1 is an exploded perspective view illustrating a structure of a wheel structure according to the present disclosure.
Figure 2:
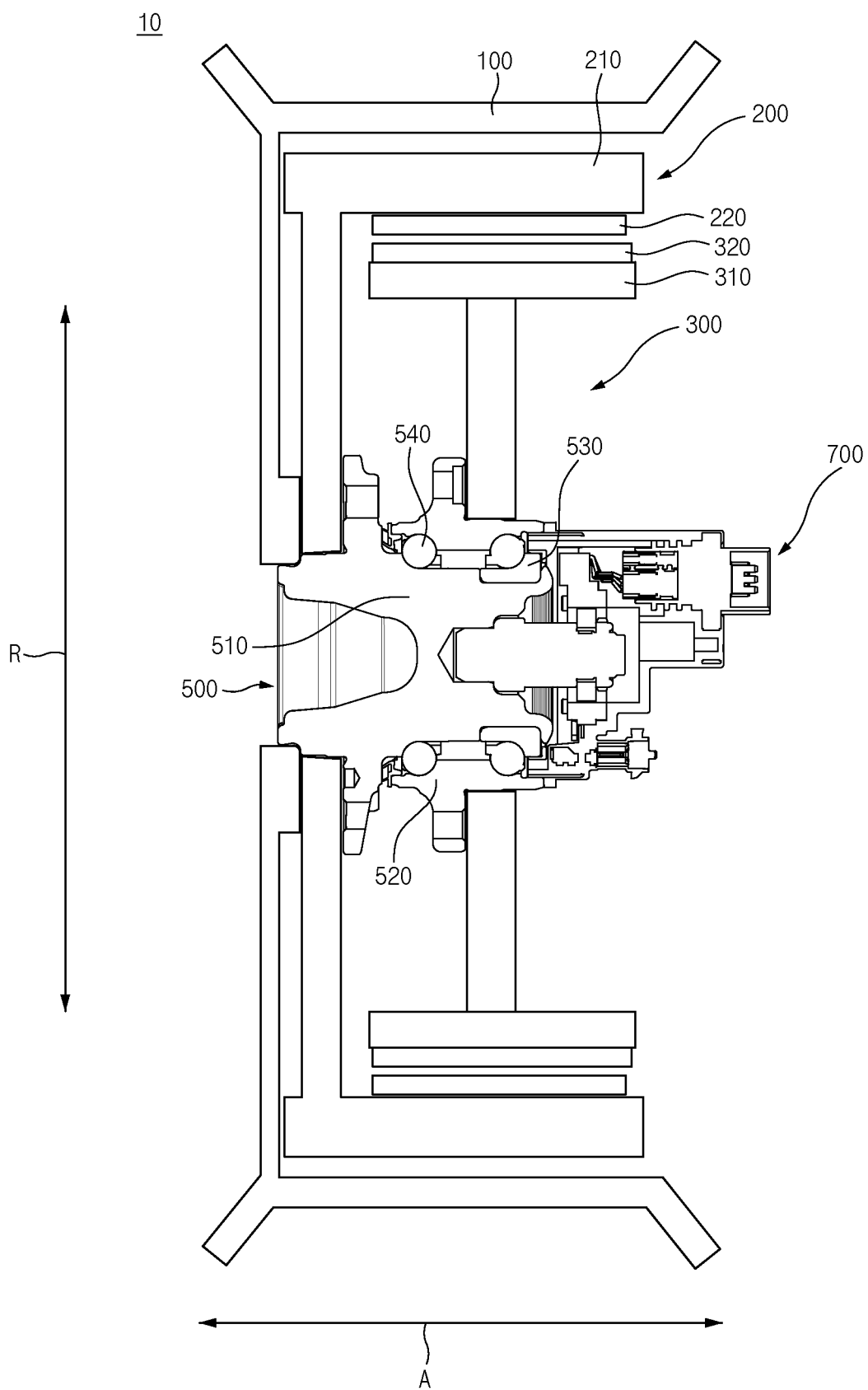
FIG. 2 is a first cross-sectional view schematically illustrating a cross-sectional structure of the wheel structure according to the present disclosure.
Figure 3:
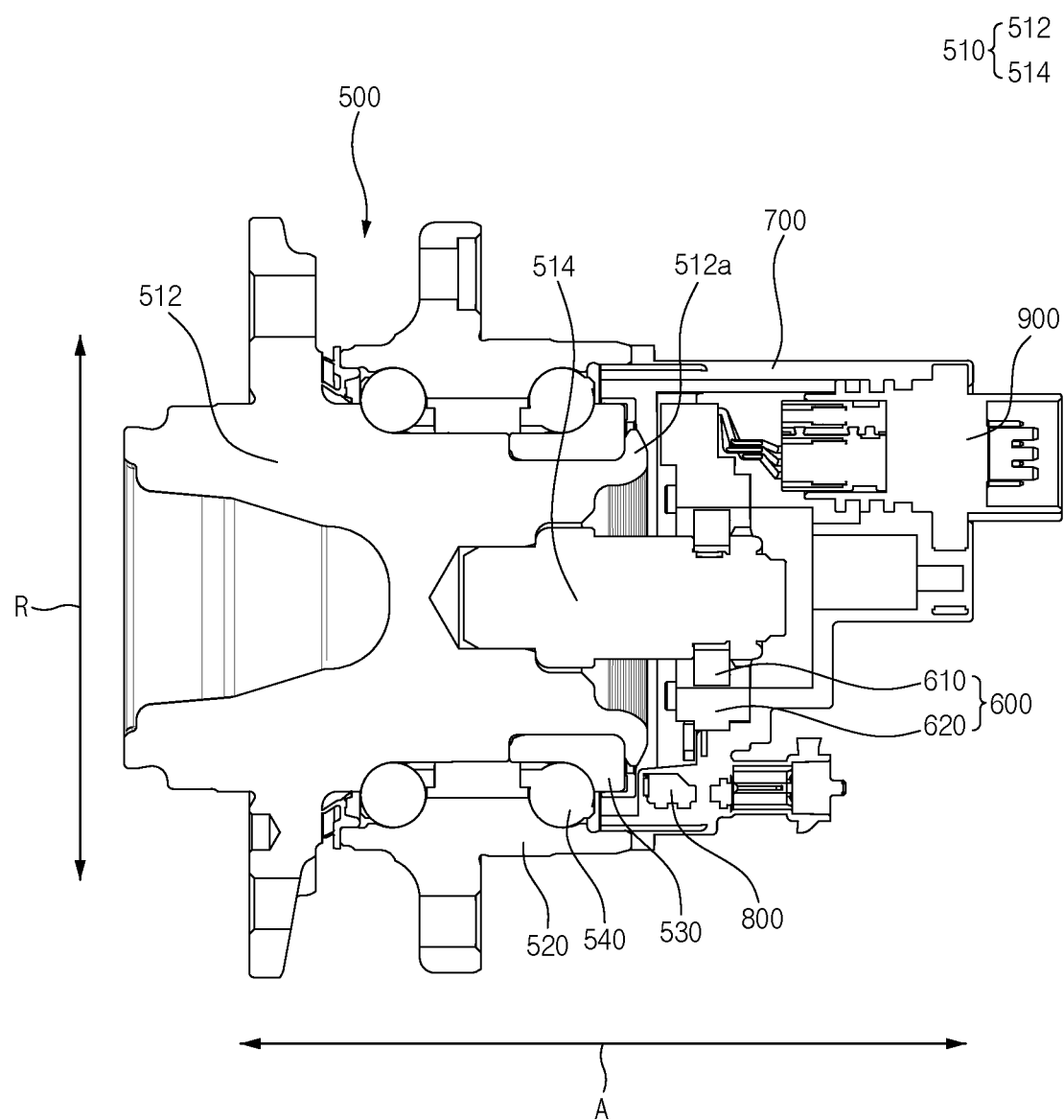
FIG. 3 is a cross-sectional view illustrating enlarged cross-sectional structures of a wheel bearing and peripheral components provided in the wheel structure according to the present disclosure.
Figure 4:
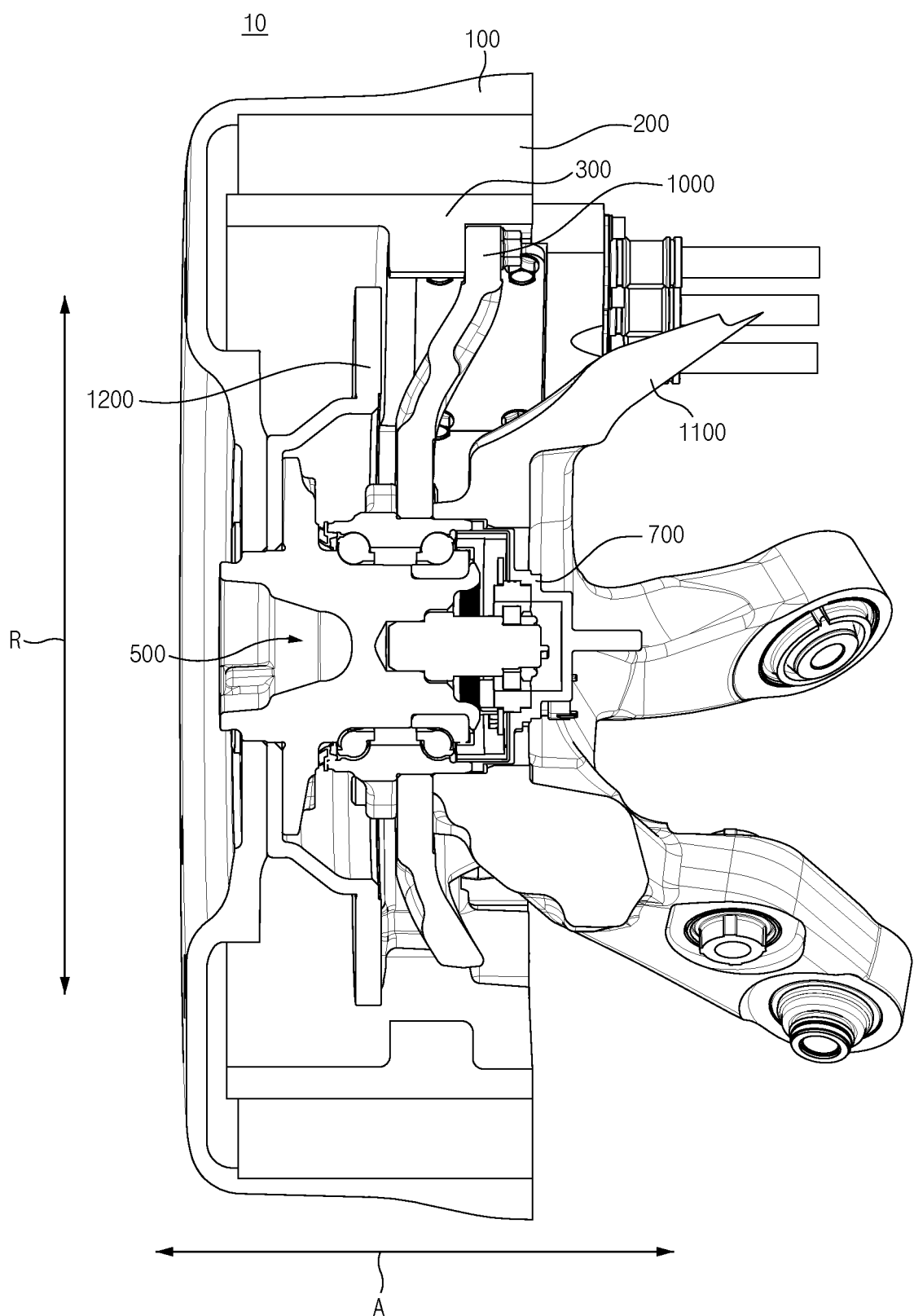
FIG. 4 is a second cross-sectional view illustrating a cross-sectional structure of the wheel structure according to the present disclosure.
Figure 5:
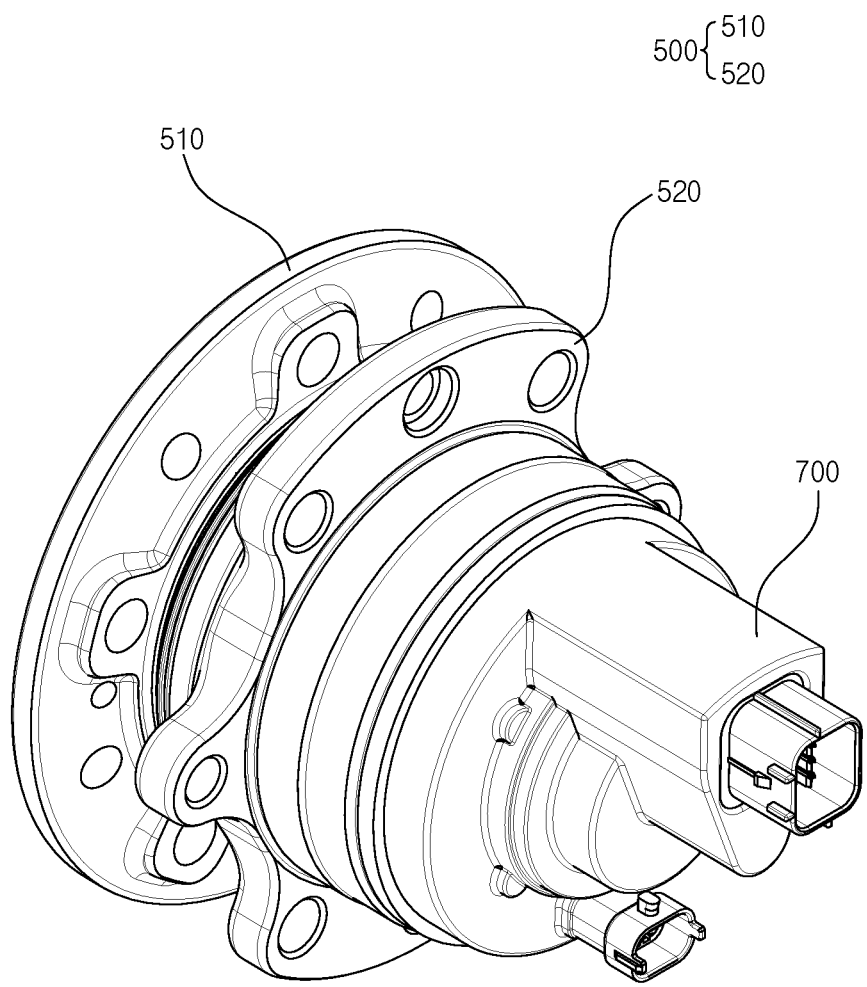
FIG. 5 is a perspective view illustrating a hub bearing provided in the wheel structure according to the present disclosure.

FIG. 1 is an exploded perspective view illustrating a structure of a wheel structure according to the present disclosure, and FIG. 2 is a first cross-sectional view schematically illustrating a cross-sectional structure of the wheel structure according to the present disclosure. FIG. 3 is a cross-sectional view illustrating enlarged cross-sectional structures of a wheel bearing and peripheral components provided in the wheel structure according to the present disclosure, and FIG. 4 is a second cross-sectional view illustrating a cross-sectional structure of the wheel structure according to the present disclosure. In addition, FIG. 5 is a perspective view illustrating a hub bearing provided in the wheel structure according to the present disclosure.

As illustrated in FIGS. 1 to 4, a wheel structure 10 according to the present disclosure may include a wheel 100 disposed in an outer region of the wheel structure 10 in a radial direction R, a rotary part 200 disposed inside the wheel 100 in the radial direction R and configured to rotate together with the wheel 100, a fixing part 300 disposed to face the rotary part 200 in the radial direction R, and a hub bearing 500 disposed at one side of the rotary part 200 and the fixing part 300. In more detail, the wheel structure 10 according to the present disclosure may include a motor configured to provide a rotational force. The motor may include the rotary part 200 and the fixing part 300.

Meanwhile, the hub bearing 500 may include a hub body 510 fixedly coupled to the rotary part 200, a hub outer race 520 fixedly coupled to the fixing part 300, one or more rolling elements 540 disposed between the hub body 510 and the hub outer race 520 in the radial direction R, and a hub inner race 530 press-fitted with the hub body 510 and disposed to face the rolling elements 400.

In more detail, the rotary part 200 may include a rotor housing 210 fixedly coupled to an inner portion of the wheel 100 in the radial direction R, and a rotor 220 fixedly coupled to an inner portion of the rotor housing 210 in the radial direction R. In addition, the fixing part 300 may include a stator housing 310 fixedly coupled to an outer portion of the hub outer race 520 in the radial direction R, and a stator 320 fixedly coupled to an outer portion of the stator housing 310 in the radial direction R. In addition, the rotor 220 and the stator 320 may be disposed to face each other in the radial direction R.

Meanwhile, as illustrated in FIG. 3, the hub body 510 may include a first region 512 disposed to face the hub outer race 520 in the radial direction R, and a second region 514 fixedly coupled to one side of the first region 512 in an axial direction A of the wheel structure 10. For example, as illustrated in FIG. 3, the second region 514 may have a structure press-fitted with the first region 512 in the axial direction A. Alternatively, the second region 514 may be integrated with the first region 512. Meanwhile, the second region 514 may protrude from the first region 512 in the axial direction A. In more detail, a part of the second region 514 may protrude from the first region 512 in the axial direction A. The first region 512 may have a concave portion that may provide a space for accommodating the second region 514.

Meanwhile, the hub inner race 530 may face the second region 514 with the first region 512 interposed therebetween. In addition, the hub body 510 may have a forming region 512a disposed at an outer side in the axial direction A of the hub body 510 and bent toward the hub inner race 530 to surround the hub inner race 530. The forming region 512a may be configured to press the hub inner race 530 to fix the hub inner race 530 to the hub body 510.

Continuing to refer to FIGS. 1 to 5, the wheel structure 10 according to the present disclosure may include a resolver 600 disposed to face the hub bearing 500 and configured to detect a position of the hub bearing 500. The resolver 600 may be configured to detect the position of the hub bearing 500 and thus detect a position of the rotary part 200. The description of the operational principle of the resolver 600 will be replaced with the contents disclosed in the related art.

In more detail, the resolver 600 may include a resolver rotor 610 and a resolver stator 620. The resolver rotor 610 may be fixedly coupled to the hub body 510. Therefore, the resolver rotor 610 may be fixed relative to the rotary part 200. More particularly, the resolver rotor 610 may be fixedly coupled to an outer portion of the second region 514 in the radial direction R.

Alternatively, the resolver stator 620 may be fixed relative to the fixing part 300. In more detail, the wheel structure 10 may further include a cap member 700 fixedly coupled to one side of the hub outer race 520 in the axial direction A. In this case, the resolver stator 620 may be coupled and disposed inside the cap member 700. In addition, the resolver stator 620 may be provided outside the resolver rotor 610 in the radial direction R and disposed to face the resolver rotor 610. Meanwhile, FIG. 3 illustrates that the forming region 512a is disposed inside the cap member 700. In more detail, the forming region 512a may be disposed inside the cap member 700 in the axial direction A and the radial direction R.

Continuing to refer to FIG. 3, the wheel structure 10 according to the present disclosure may further include a speed sensor 800 configured to detect a rotational speed of the hub bearing 500. In this case, the speed sensor 800 may be disposed inside the cap member 700. For example, the speed sensor 800 may be disposed in a space between the hub body 510 and the hub outer race 520 in the radial direction R.

In addition, the wheel structure 10 may further include a connector 900 electrically connected to the resolver 600 and configured to supply electric power to the resolver 600. For example, as illustrated in FIG. 3, the connector 900 may be inserted and coupled into the cap member 700.

Figure 6:
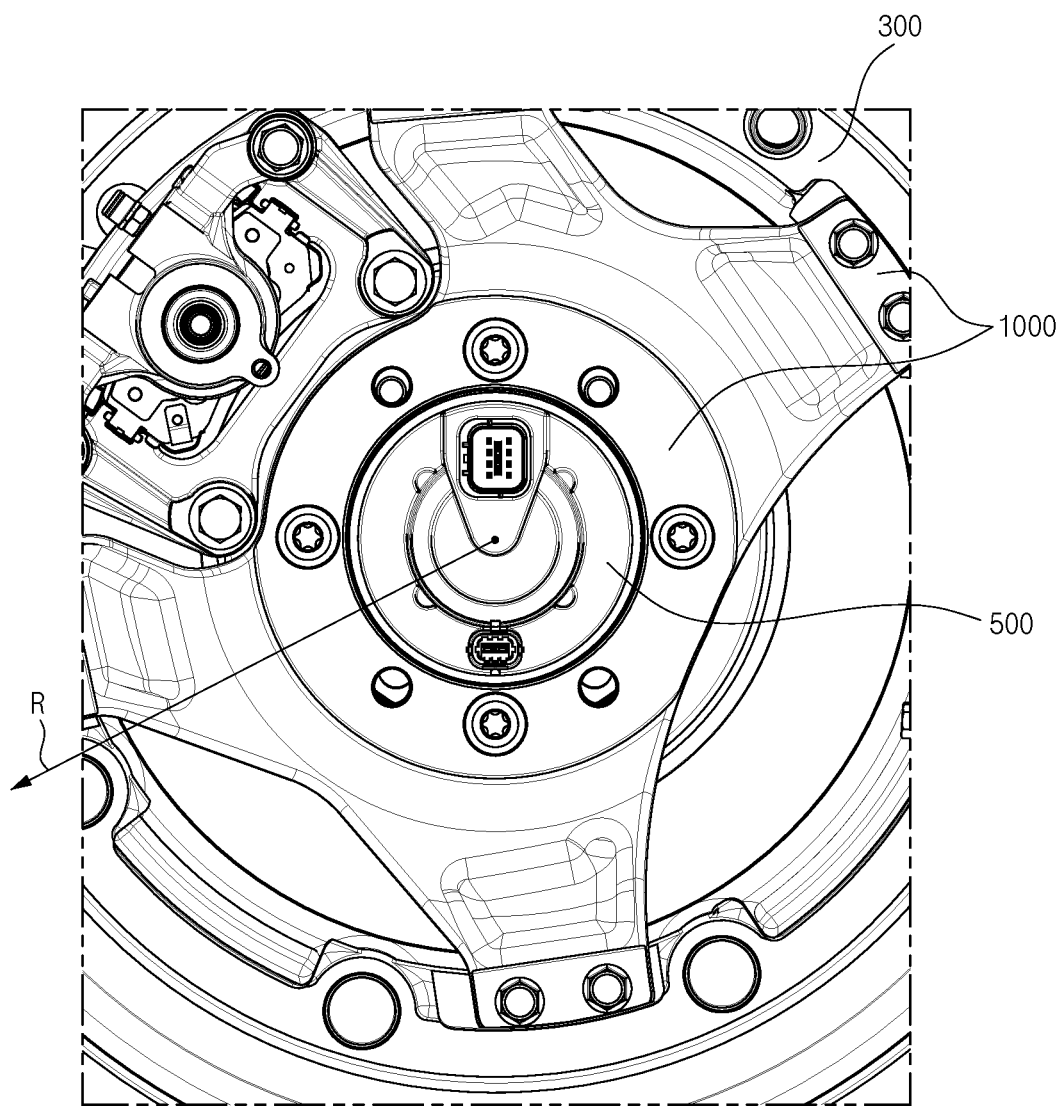
FIG. 6 is a side view illustrating a structure for coupling the wheel bearing and a bracket in the wheel structure according to the present disclosure.
Figure 7:
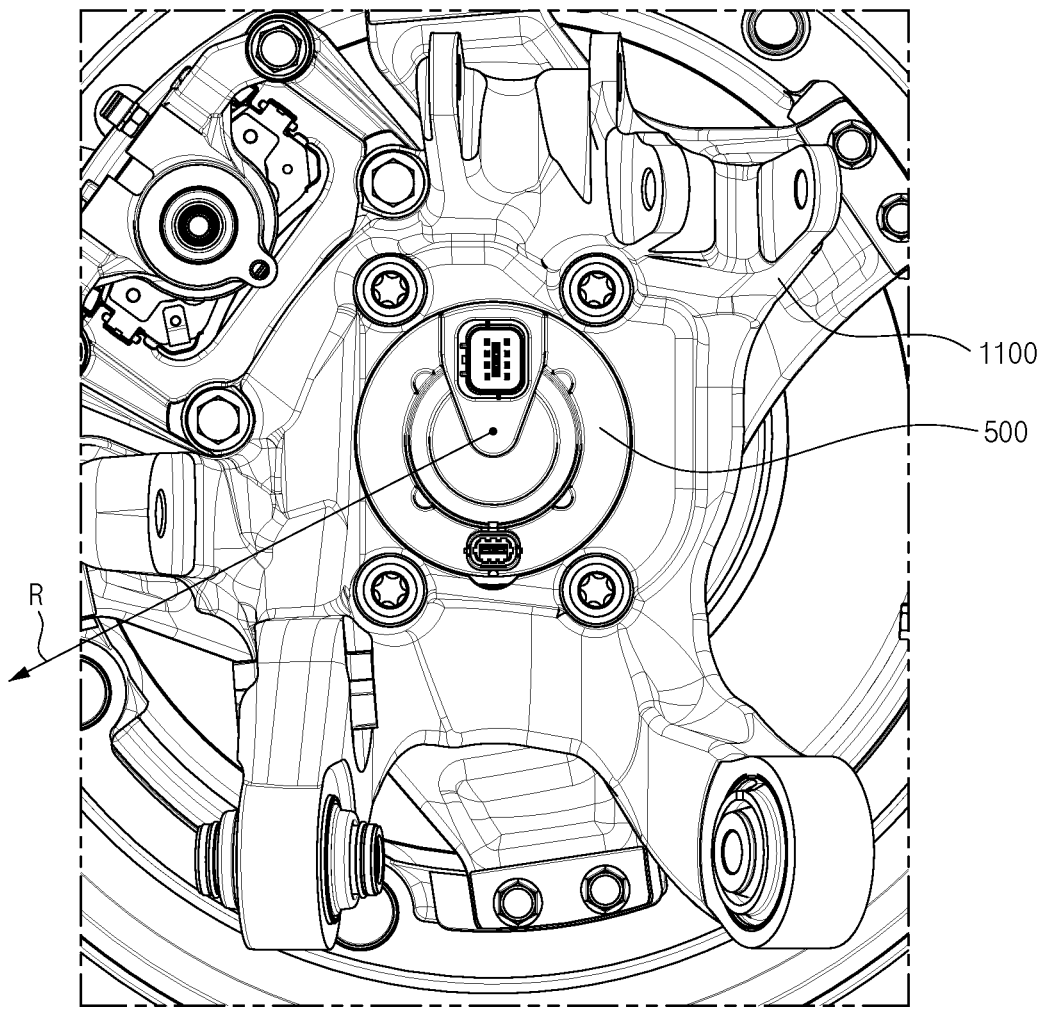
FIG. 7 is a side view illustrating a structure for coupling the wheel bearing, the bracket, and a carrier in the wheel structure according to the present disclosure.

FIG. 6 is a side view illustrating a structure for coupling the wheel bearing and a bracket in the wheel structure according to the present disclosure, and FIG. 7 is a side view illustrating a structure for coupling the wheel bearing, the bracket, and the carrier in the wheel structure according to the present disclosure.

Continuing to refer to FIGS. 1 to 7, the wheel structure 10 according to the present disclosure may further include a bracket 1000 fixedly coupled to the hub outer race 520 and the stator housing 310. That is, as illustrated in the drawings, an inner region in the radial direction R of the bracket 1000 may be fixedly coupled to the hub outer race 520, and an outer region in the radial direction R of the bracket 1000 may be fixedly coupled to the stator housing 310.

More particularly, the inner region in the radial direction R of the bracket 1000 may be coupled to the hub outer race 520 by bolting, and the outer region in the radial direction R of the bracket 1000 may be coupled to the stator housing 310 by bolting.

In addition, the wheel structure 10 according to the present disclosure may further include a carrier 1100 fixedly coupled to the bracket 1000. In this case, an inner region in the radial direction R of the carrier 1100 may be coupled to the bracket 1000 by bolting.

The description of the present disclosure will be made with reference to the above-mentioned contents. According to the present disclosure, the resolver 600 is disposed adjacent to the hub bearing 500. Therefore, the size of the resolver 600 may be reduced, and thus the size of the wheel structure 10 may be reduced in comparison with a case in which the resolver 600 is disposed adjacent to the motor including the rotary part 200 and the fixing part 300.

Vehicle

A vehicle according to the present disclosure may include the wheel structure 10, and a vehicle body (not illustrated) to which at least a partial region of the wheel structure 10 is fixedly coupled. In this case, the wheel structure 10 may include the wheel 100, the rotary part 200 disposed inside the wheel 100 and configured to rotate together with the wheel 100, the fixing part 300 disposed to face the rotary part 200, the hub bearing 500 disposed at one side of the rotary part 200 and the fixing part 300, and the resolver 600 disposed to face the hub bearing 500 and configured to detect the position of the hub bearing 500.

In addition, the hub bearing 500 may include the hub body 510 fixedly coupled to the rotary part 200, and the hub outer race 520 fixedly coupled to the fixing part 300. In addition, the resolver 600 may include the resolver rotor 610 and the resolver stator 620, and the resolver rotor 610 may be fixedly coupled to the hub body 510.

In addition, the vehicle according to the present disclosure may further include a brake assembly 1200 disposed between the wheel 100 and the hub body 510 in the radial direction R of the wheel structure 10.

Meanwhile, the above-mentioned description of the wheel structure 10 according to the present disclosure may also be equally applied to the wheel structure provided in the vehicle according to the present disclosure.

The present disclosure has been described with reference to the limited embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

What is claimed is:

1. A wheel structure, comprising:
   a wheel;
   a rotary part disposed inside the wheel and configured to rotate together with the wheel;
   a fixing part facing the rotary part;
   a hub bearing disposed at one side of the rotary part and the fixing part; and
   a resolver facing the hub bearing and configured to detect a position of the hub bearing,
   wherein the hub bearing comprises:
   a hub body fixedly coupled to the rotary part; and
   a hub outer race fixedly coupled to the fixing part,
   wherein the resolver comprises:
   a resolver rotor; and
   a resolver stator, and
   wherein the resolver rotor is fixedly coupled to the hub body.

2. The wheel structure of claim 1, further comprising:
   a cap member fixedly coupled to one side of the hub outer race in an axial direction,
   wherein the resolver stator is disposed inside the cap member.

3. The wheel structure of claim 2, wherein the resolver stator is disposed outside the resolver rotor in a radial direction, and disposed to face the resolver rotor.

4. The wheel structure of claim 2,
   wherein the hub body comprises:
   a first region facing the hub outer race in a radial direction; and
   a second region fixedly coupled to one side of the first region in the axial direction, and
   wherein the resolver rotor is fixedly coupled to an outer portion of the second region in the radial direction.

5. The wheel structure of claim 4, wherein the second region is integrated with the first region, or the second region has a structure press-fitted with the first region in the axial direction.

6. The wheel structure of claim 4,
   wherein the hub bearing further comprises:
   a rolling element disposed between the hub body and the hub outer race in the radial direction; and
   a hub inner race press-fitted with the hub body and facing the rolling element, and
   wherein the hub inner race faces the second region, and the first region is interposed between the hub inner race and the second region.

7. The wheel structure of claim 6,
   wherein the hub body includes a forming region disposed at an outer side of the hub body in the axial direction, and disposed inside the cap member, and
   wherein the forming region is bent to surround the hub inner race.

8. The wheel structure of claim 4, wherein the second region protrudes from the first region in the axial direction.

9. The wheel structure of claim 2, further comprising:
a speed sensor disposed inside the cap member, and configured to detect a rotational speed of the hub bearing.

10. The wheel structure of claim 9, wherein the speed sensor is disposed in a space between the hub body and the hub outer race in a radial direction.

11. The wheel structure of claim 2, further comprising:
a connector inserted into the cap member, and electrically connected to the resolver.

12. The wheel structure of claim 1, wherein the rotary part comprises:
- a rotor housing fixedly coupled to an inner portion of the wheel in a radial direction; and
- a rotor fixedly coupled to an inner portion of the rotor housing in the radial direction.

13. The wheel structure of claim 12,
wherein the fixing part comprises:
- a stator housing fixedly coupled to an outer portion of the hub outer race in the radial direction; and
- a stator fixedly coupled to an outer portion of the stator housing in the radial direction, and wherein the rotor and the stator face each other in the radial direction.

14. The wheel structure of claim 13, further comprising:
a bracket fixedly coupled to the hub outer race and the stator housing,
wherein an inner region of the bracket in the radial direction is bolted to the hub outer race, and an outer region of the bracket in the radial direction is bolted to the stator housing.

15. The wheel structure of claim 14, further comprising:
a carrier fixedly coupled to the bracket,
wherein an inner region of the carrier in the radial direction is bolted to the bracket.

16. A vehicle, comprising:
a wheel structure; and
a vehicle body to which a portion of the wheel structure is fixedly coupled,
wherein the wheel structure comprises:
- a wheel;
- a rotary part disposed inside the wheel and configured to rotate together with the wheel;
- a fixing part facing the rotary part;
- a hub bearing disposed at one side of the rotary part and the fixing part; and a resolver facing the hub bearing and configured to detect a position of the hub bearing,
wherein the hub bearing comprises:
- a hub body fixedly coupled to the rotary part; and
- a hub outer race fixedly coupled to the fixing part, wherein the resolver comprises:
- a resolver rotor; and
- a resolver stator, and wherein the resolver rotor is fixedly coupled to the hub body.

17. The vehicle of claim 16, further comprising:
a brake assembly disposed between the wheel and the hub body in a radial direction of the wheel structure.

* * * * *